July 30, 1963  P. L. ULLOM  3,099,078
LATCHING DEVICES

Filed May 4, 1961  4 Sheets-Sheet 1

INVENTOR
Pliny Leroy Ullom

BY Hastings Ackley
and
Walter J. Jag
ATTORNEYS

INVENTOR
Pliny Leroy Ullom

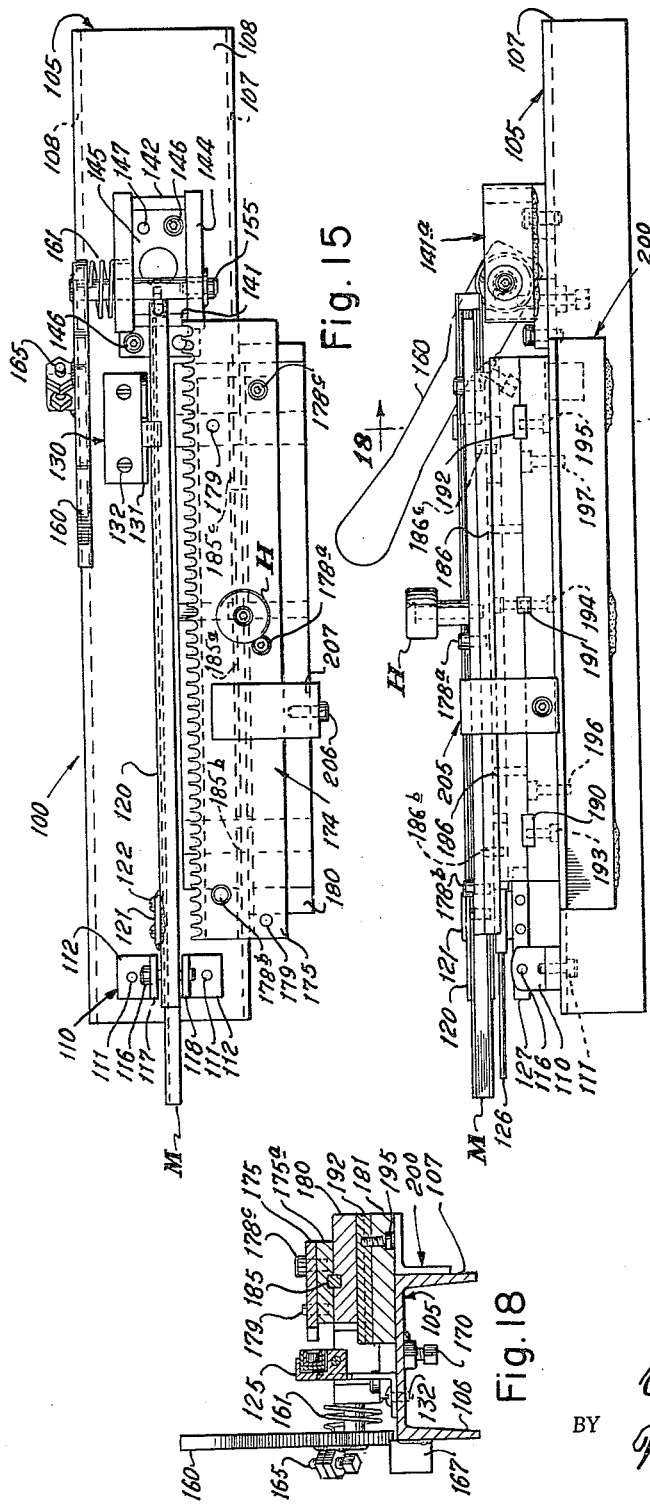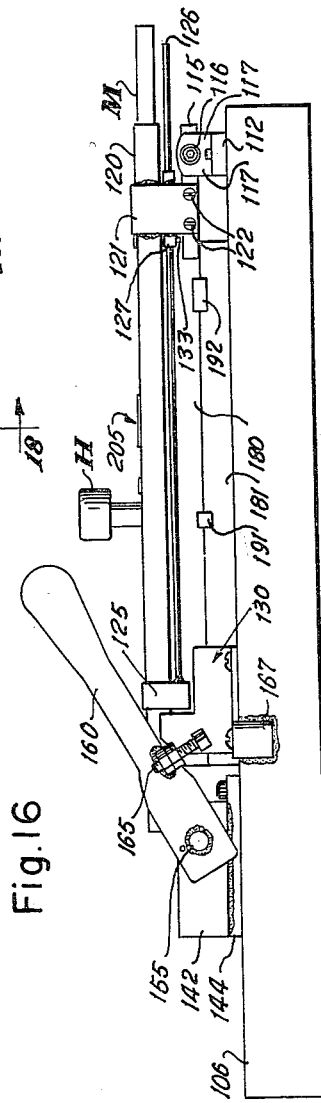

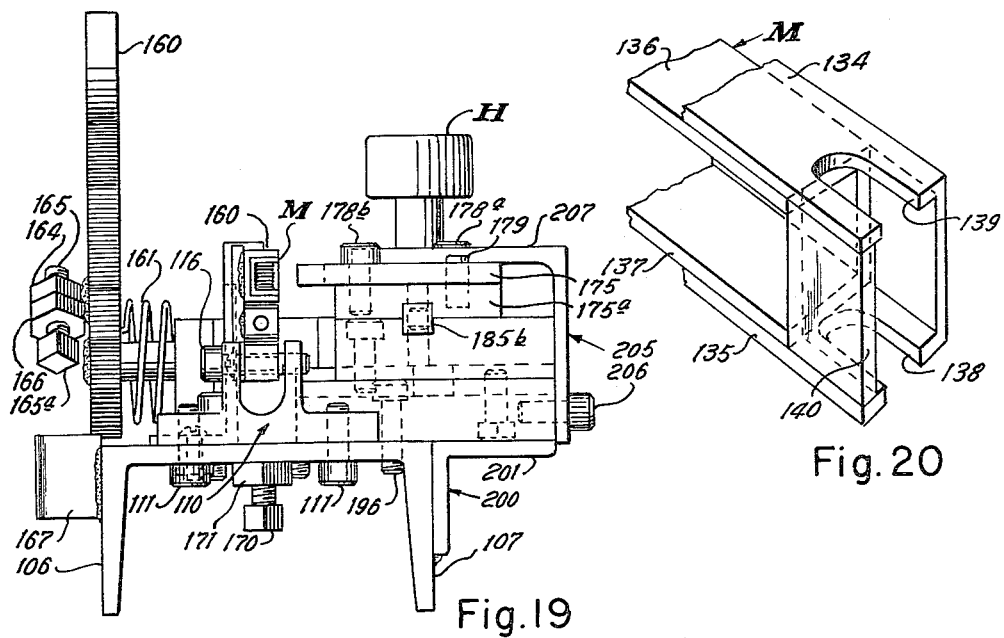
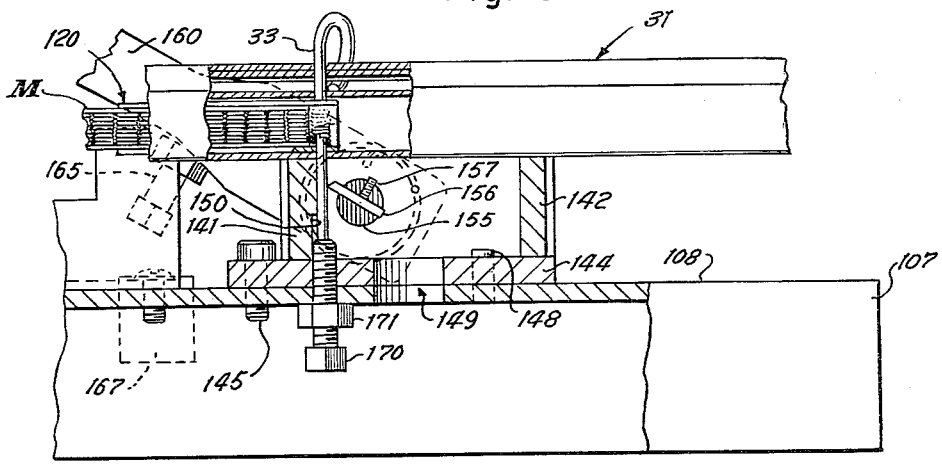
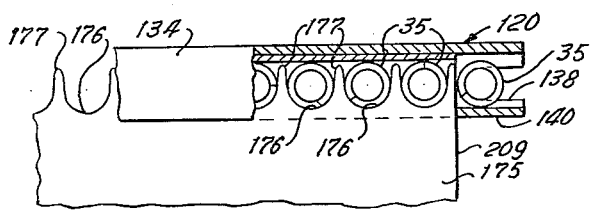

United States Patent Office 3,099,078
Patented July 30, 1963

3,099,078
LATCHING DEVICES
Pliny L. Ullom, P.O. Box 218, Sweetwater, Tex.
Filed May 4, 1961, Ser. No. 107,699
9 Claims. (Cl. 29—267)

This invention relates to latching devices for securing a screen frame within the opening of a window and to tools for installing a latching device on a screen frame.

One object of this invention is to provide a new and improved latching device for latching or securing a screen frame within the opening of a window frame.

Another object is to provide a new and improved latch device for securing a screen frame within the opening of a window frame comprising a latch pin which is carried by the screen frame and spring-biased to extend outwardly of the screen frame for engagement with cooperating latch means of the window frame.

Still another object is to provide a new and improved tool for installing a latching device on a screen frame.

A further object is to provide a tool for installing a latch pin and biasing spring therefor on a screen frame member wherein the spring is positionable to bias the latch pin to a normally operative position for latching the screen frame in a window frame.

A still further object is to provide a tool for installing a latch device on a hollow screen frame member which comprises a pivotal arm for holding a coil spring on which the screen frame member may be supported and the latch pin may be inserted through aligned apertures of the frame member and the coil of the spring, and a tool member operative to form a spur or upset on the shaft of the latch pin whereby the latch pin may be installed on the frame member with the coil spring disposed about the shaft of the pin with one end of the spring engaging the inner surface of the frame member and its other end engaging the spur of the latch pin to bias the latch pin outwardly of the frame member.

A still further object is to provide a tool for installing a latch device in a hollow frame member comprising a pivotal arm adapted to carry a magazine of coil springs; a means for causing one of the springs of the magazine to be positioned in the arm whereby a latch pin may be inserted through aligned apertures of the frame member and the coil of the spring, and means for forming a spur on the shank of the latch pin whereby the latch pin may be installed on the frame member with one end of the spring in engagement with the spur to bias the latch pin in a given position relative to the frame member.

Additional objects and advantages of the invention will be readily apparent from the reading of the following description of a device constructed in accordance with the invention, and reference to the accompanying drawings thereof, wherein:

FIGURE 15 is a top plan view of another form of installation tool for installing the latch device of the invention in a screen frame member;

FIGURE 16 is a right side view of the tool of FIGURE 15;

FIGURE 17 is a left side view of the tool of FIGURE 15;

FIGURE 18 is a sectional view taken along the line 18—18 of FIGURE 16;

FIGURE 19 is an end view of the tool of FIGURE 15;

FIGURE 20 is a fragmentary perspective view of a pivotal arm of the tool of FIGURE 15, showing a magazine chamber member inserted therein for feeding coil springs to the recess or socket in the end of the pivotal arm;

Figure 1:
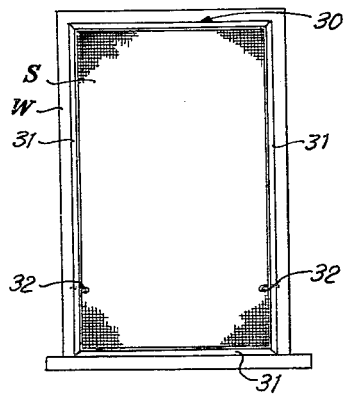
FIGURE 1 is a front view of a screen frame secured within the opening of a window frame by spring-biased latching devices of the invention.

FIGURE 21 is a fragmentary view of the tool of FIGURE 15, showing the spur forming member thereof in engagement with a latch pin carried by a screen frame member and disposed through a coil spring in the recess of the magazine supporting pivotal arm of the tool; and, FIGURE 22 is a fragmentary plan view of the tool of FIGURE 15, showing a spring feed plate of the tool in engagement with the coil springs in the spring magazine supported by the pivotal arm after moving a coil spring from the magazine into the recess of the pivotal arm.

Referring now to the drawings, a window screen S having a frame 30 is shown installed within the opening of a window frame W and locked in place therein by latch members 32 of the invention.

Figure 5:
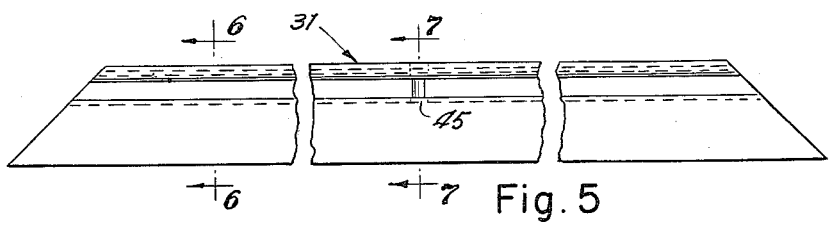
FIGURE 5 is a side view of a screen frame member in which the latching device may be installed.
Figure 6:
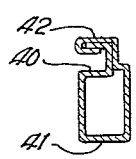
FIGURE 6 is a sectional view taken along the line 6—6 of FIGURE 5.
Figure 7:
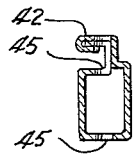
FIGURE 7 is a sectional view taken along the line 7—7 of FIGURE 5.

Each latch 32 includes a pin 33 having a ring or finger loop 34 at one end and a coil spring 35 which encircles the shaft of the pin and is disposed thereon between the loop of the pin and a spur or upset 36 on the pin shaft near the other end thereof. The latch pin is adapted for use with screen frames, particularly metallic screen frames, of a hollow or tubular construction as illustrated by the screen frame member 31 shown in FIGURES 5 to 7. The screen frame members 31 are joined to form the rectangular screen frame 30 and each is formed of a single sheet of metal. Each hollow or tubular frame member is of a generally rectangular cross-section having inner and outer side members 40 and 41, respectively, and a screen clamping portion 42 extending inwardly from the inner side member 40. The sides are provided with aligned apertures 45 for receiving the latch pin 33.

Figure 10:
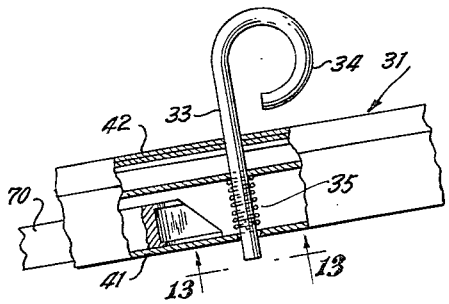
FIGURE 10 is a fragmentary view, partly in section, of a screen frame member supported by an arm of the tool of FIGURE 3, showing the latch device of this invention installed on the screen frame member.

The coil spring 35 of the latch device is inserted within the screen frame member 31 with the axis of its coil aligned with the apertures 45 whereby the spring encloses the shaft of the latch pin when the pin is inserted through the apertures. In the normal operating position of the latch device as installed on the screen frame member, one end of the spring is in abutting relation to the shaft spur 36 of the pin and its other end is in abutting relation to the inner surface of the side 40. The spring biases the end of the latch pin, which is remote from its loop end, outwardly through the aperture 45 in the outer side member 41, as shown in FIGURE 10. It is thus readily apparent that in the normal operative position of the pins of the latch devices the portions thereof which protrude outwardly of the screen frame are adapted to cooperate with latch means, such as latch recesses in a window frame, to secure the screen in the opening of the window frame.

The spur 36 on the latch pin 33 is formed adjacent the end 33a of the pin after it has been inserted through the screen frame apertures 45 and the coil spring disposed thereabout within the frame.

In installing the latch pin, which is formed of harder metal than the soft metal frame, the pin is pulled by its finger loop 34 to cause the spur 36 to pass through the frame member 41 and gouge a notch 49 in the wall which defines the aperture 45. By partially rotating the pin angularly to displace the spur relative to the notch 49, excessive projection of the pin outwardly through the frame of the screen is prevented by engagement of the spur with the inner surface of the frame member 41.

Figure 2:
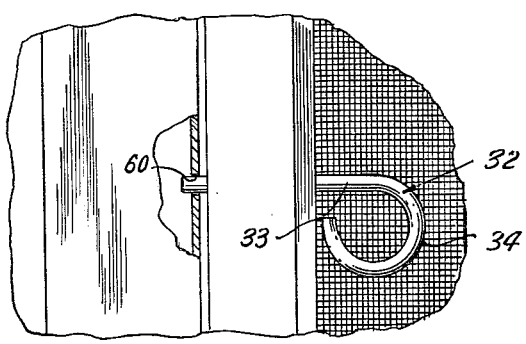
FIGURE 2 is a fragmentary view, partly in section, showing a latching device of the invention installed on a screen frame member and in latching engagement with a window frame.
Figure 11:
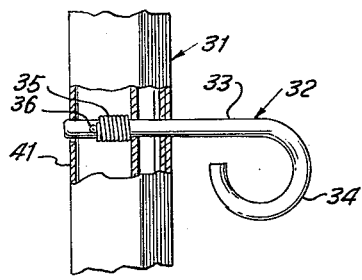
FIGURE 11 is a fragmentary view of a screen frame member, partly in section, showing the latch device of this invention installed thereon with the latch pin of the device moved to retracted non-latching position.
Figure 12:
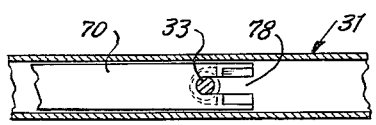
FIGURE 12 is a sectional view taken along the line 12—12 of FIGURE 8.

To mount the screen frame 30 in a window frame, each latch pin is retracted by pulling on its loop 34 so as to compress the spring 35, as illustrated in FIGURE 11. When the shaft of the latch pin is aligned with an accommodating aperture 50 in the window frame, the latch pin is released for movement to its normally outwardly biased position wherein the straight end portion of the shaft protrudes from the screen frame and passes into the aperture in the window frame as shown in FIGURE 2, thus locking the screen frame in the window frame. Preferably, a pair of latch pins are provided at opposite sides of the screen frame and disposed as shown in FIGURE 1. However, the number of pins and their particular locations on the frame may be varied as desired.

Figure 3:
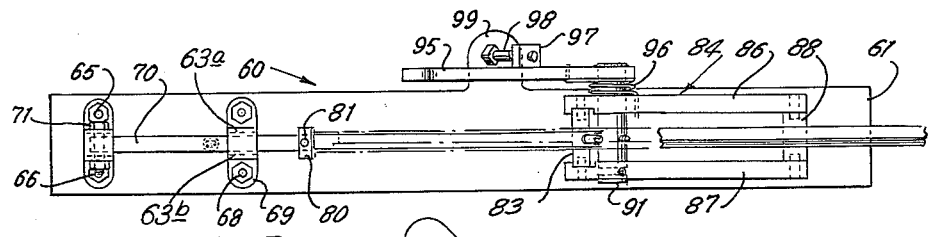
FIGURE 3 is a top plan view of an installation tool for installing a latching device on a screen frame member.
Figure 4:
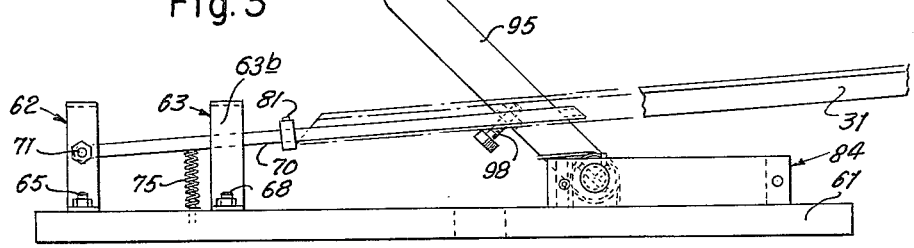
FIGURE 4 is a side elevational view of the installation tool of FIGURE 3, showing a screen frame member mounted on the tool in position preparatory to the installation of a latch device in the frame member.

A tool 60 for installing the latch pin and its biasing spring in the screen frame members is illustrated in FIGURES 3 and 4. The tool 60 includes an elongate base 61 on which are disposed a pair of U-shaped bracket members 62 and 63 spaced longitudinally of the base and mounted thereon in upright but inverted relation thereto. The bracket 62, adjacent one end of the base, is secured thereto by bolts 65 which pass through suitable apertures of the base and of the flanges 66 of the legs of the U-shaped bracket. The bracket 63 is similarly secured to the base by bolts 68 which pass through suitable apertures of the base and of its flanges 69.

An elongated arm 70 is pivotally mounted at one end on the bracket 62 by means of a transverse shaft 71 which extends through an aperture adjacent one end of the arm with its end portions journalled in the legs of the bracket. The arm extends through the U-shaped bracket 63 and is guided in its pivotal movement about the axis of the shaft 71 by the legs 63a and 63b of the bracket 63. The top portion of the bracket 63 acts as a stop for limiting the pivotal upward movement of the arm relative to the base 61. A coil spring 75 located between the brackets 62 and 63, and telescoped at one end over the retaining pin 76 of the base biases the arm upwardly from the base.

Figure 14:
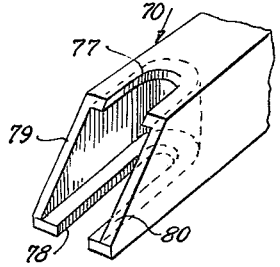
FIGURE 14 is a fragmentary perspective view of one end of a pivotal arm of the tool of FIGURE 3, showing the recess in the end thereof for carrying a coil spring adapted to be installed in a screen frame member.
Figure 13:
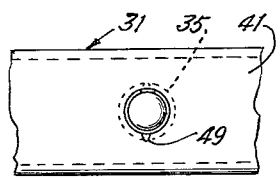
FIGURE 13 is a view taken along the line 13—13 of FIGURE 10.

The free end of the arm 70 is hollowed out and bifurcated by longitudinally extending slots 77 and 78, as shown in FIGURE 14. The hollowed out end of the arm defines a socket for accommodating the coil spring 35. The spring is adapted to be disposed within the socket with the axis of the coil extending vertically through the slots 77 and 78. The width of the slots conforms substantially to the inner diameter of the coil so that the lower end of a spring disposed within the socket will abut the inner surface of the socket on both sides of the slot 78 and its upper end will abut the inner surface of the socket on both sides of the slot 77.

Vertical edge surfaces 79 and 80 at the end of the arm are beveled to facilitate the telescoping of a screen frame member, such as the member 31, on the arm 70, as shown in FIGURE 4. A slide stop 80, adjustable along the length of the arm 70 and securable at a selected position thereon by means of a set screw 81, is adapted to engage the end of a screen frame member telescoped over the arm. The slide stop is positioned on the arm in such positions that when a screen frame member is sleeved thereon with its end engaging the stop 80, the apertures 45 of the screen frame member will also align with the slots in the socket end of the pivot arm and the spring supported in the socket. A latch pin 33 is then inserted through the aligned apertures of the frame, the slots of the pivot arm, and the coil spring.

Downward movement of the pivotal arm 70 relative to the base 61 is limited by the stop member 83 of a rectangular frame 84 which is mounted adjacent the end of the base 61 remote from the bracket 62. The rectangular frame, which comprises transverse members 83 and 88 and longitudinal members 86 and 87 disposed parallel to the plane of movement of the pivotal arm 70 on opposite sides thereof, is disposed to lie flat along the base and is secured thereto by welding or in any other suitable manner. The members of the rectangular frame are secured to one another in any suitable manner as by bolt 88. The transverse member 83 is provided with a vertical groove 89 adapted to accommodate the latch pin 33 when the pivotal arm 70 is pivoted to its lowermost position.

A shaft 91, supporting a spur forming tool 92, is rotatably journalled in the longitudinal members of the frame 84 in perpendicular relation to the plane of movement of the pivotal arm 70. The spur forming tool, which is in the form of a bar of hard metal provided with a sharp edge at one end, extends transversely through the shaft 91 with its longitudinal axis in the plane of movement of the pivotal arm 70. The tool is held in place on the shaft by a set screw which is threaded in the shaft to engage the tool 92 at a right angle to its longitudinal axis.

An elongate operating lever 95 for rotating the shaft 91 and the tool 92, is rigidly secured to a portion of the shaft 91 which extends outwardly from the rectangular frame member 86. The operating lever is normally biased upwardly at approximately a 45 degree angle relative to the base 61 by a coil spring 96 disposed in encircling relation about the portion of the shaft which extends outwardly of the frame 84. One end of the spring is secured to the operating lever and its other end attached to the frame member 86.

A flange 97 is integral with the operating lever and is provided with a threaded aperture for receiving a threaded aperture for receiving a threaded adjusting bolt 98. The bolt is attached substantially right angularly to the longitudinal axis of the operating lever with its axis disposed in a vertical plane parallel to the plane of movement of the operating lever. As the lever is pivoted downwardly, the head of the bolt is adapted to engage an ear 99 of the base 61, thus limiting the pivotal movement of the lever. The bolt, provides a means for varying the limit of pivotal movement of the lever.

Figure 8:
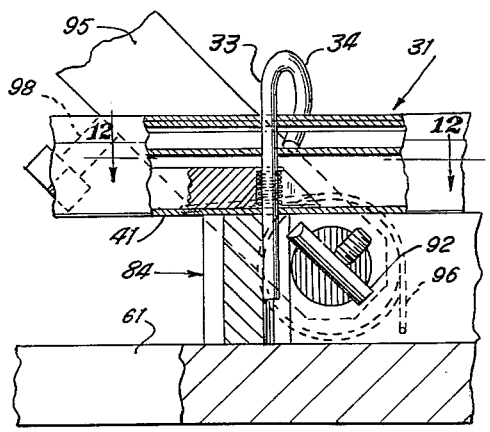
FIGURE 8 is a fragmentary view of the installation tool of FIGURE 3, with some parts broken away, showing a screen frame member carrying the latch pin of the latch device of this invention mounted in position on the installation tool for engagement with a spur forming member of the tool.
Figure 9:
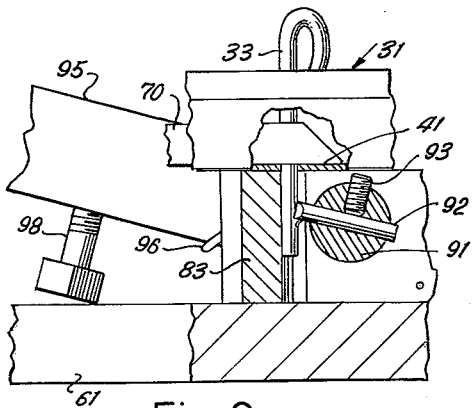
FIGURE 9 is a view similar to FIGURE 8, showing the spur forming member of the installation tool of FIGURE 3 in engagement with the latch pin of the latch device and forming a spur thereon.

As shown in FIGURE 8, the longitudinal axes of the operating lever and the tool 92 are in parallel relation so that in the normal upwardly biased position of the lever, the tool 92 is similarly upwardly biased.

When the pivotal arm 70 is moved to its lowermost position with a portion of the latch pin 33 disposed within the groove 89, downward movement of the operating lever rotates the shaft 91 and causes the sharp edge of the tool 92 to engage the shank of the pin 33. By exerting sufficient downward force on the operating lever, the tool 92 is caused to gauge the shank of the pin and form a spur or upset 36 thereon.

The screen frame member with the latch pin is then removed by releasing the operating lever to permit it to move to its normal upper position due to the force exerted by the coil spring 96. The arm 70 is then allowed to pivot upwardly due to the force exerted by the spring 75, and the screen frame member is removed from the pivotal arm 70. The loop of the latch pin is then pulled outwardly to cause the spur 36 to pass through the outer side 41 of the screen frame member, forming a notch 49 therein as it does so. The pin is then rotated to displace the spur relative to the notch 49. The latch pin is then in properly installed position on the frame member.

A modified installation tool 100 for installing the latch device of this invention in a screen frame member is illustrated in FIGURES 15 to 22. The tool 100 comprises an inverted channel shaped base 105 having a pair of flanges 106 and 107 which extend downwardly from the web 108 thereof. A pair of L-shaped brackets 110 are bolted to the web 108 at one end of the base by means of bolts 111 which extend through legs 112. A bar 115 is pivotally secured to the brackets 110 by a shaft 116 which extends transversely through the bar 115 and has its ends rotatably journalled in the upwardly extending arms 117 and 118 of the brackets. The pivotal arm 120, corresponding to the pivotal arm 70 of the installation tool of FIGURE 3, is secured to the bar 115 by a bracket 121 which is secured to the bar by screws 122 and to the pivotal arm 120 by welding, or other suitable means. It will therefore be apparent that pivotal movement of the bar will also result in pivotal movement of the pivotal arm.

A C-shaped slide stop 125, slidably mounted on the pivotal arm, is secured to one end of an elongate rod 126 disposed beneath the pivotal arm in parallel relation therewith. The rod 126 is slidably disposed in a tubular guide 127 fixed to the bracket 121 by welding or other means whereby longitudinal movement of the rod through the tubular guide results in sliding movement of the stop 125 along the arm 120.

An L-shaped stop 130 having an upright arm 131 is bolted to the base 105 by bolts 132 with the upright portion 131 adjacent the pivotal arm when the pivotal arm is pivoted to a horizontal position parallel with the base 105. The stop 130 limits the movement to the right of the slide stop 125 on the pivotal arm when the arm is disposed horizontally as viewed in FIGURE 15. The stop 130 is spaced sufficiently far from the pivotal arm when the arm is horizontal to permit a screen frame telescoped over the pivotal arm to clear the stop.

The slide stop 125 is adjustable along the length of the pivotal arm and is securable at selected positions thereon by means of a set screw 133 in the guide 127.

The pivotal arm is of channel shaped section and is adapted to receive a spring magazine M, also channel shaped, which is insertable lengthwise within the arm to be carried therein. The outer surfaces of the flanges 134 and 135 of the magazine frictionally engage the inner surfaces of the flanges 136 and 137, respectively, of the pivotal arm so that the magazine is frictionally held in the pivotal arm when inserted therein. The upper and lower flanges of the pivotal arm are provided with longitudinally extending slots 138 and 139, respectively, at the free end of the pivotal arm, as shown in FIGURE 20. A side stop 140, corresponding in length to the lengths of the slots, is attached to the upper and lower flanges of the pivotal arm to close the open side thereof at the slots. The side stop 140 engages the end of the spring coil magazine M to limit its longitudinal movement toward the free end of the pivotal arm and thus properly position the magazine in the arm. A coil spring 35 and a latch pin 33 are adapted to be disposed between the flanges of the pivotal arm in alignment with the slots.

Downward movement of the pivotal arm relative to the base 105 is limited by the transverse end member 141 of a rectangular box frame 141a mounted on the base 105 remote from the bracket 110. The box frame, which includes transverse end members 141 and 142, longitudinal members 143 and 144, and a rectangular bottom member 145 resting on the base and secured thereto by bolts 146 which extend through the bottom member 145. A pair of friction fitting pegs 147, also extend through the base 105 and the bottom member 145 further to secure against movement on the base. Aligned apertures in the base 105 and the bottom member 145 provide an access port 149 which permits easy access to the shaft 155 and the tool 156 for adjustment of the tool or installation thereof. The transverse end member 141 of the box frame has a vertical groove 150 adapted to accommodate the latch pin 33 when the pivotal arm is pivoted to its lowermost position.

A shaft 155, supporting a spur forming tool 156, is rotatably journalled in the longitudinal members of the box frame in perpendicular relation to the vertical plane of movement of the pivotal arm 120. The spur forming tool 156, which is identical to the spur forming tool 92 of the installation tool of FIGURE 3, is similarly mounted by a set screw 157 threaded in a suitable base in the shaft. The spur forming tool 156 extends through a diametrical passage of the shaft.

An elongate operating lever 160 for rotating the shaft 155 and the tool 156, is secured to the end portion of the shaft which extends outwardly of the box frame longitudinal member 143. The operating lever is normally biased upwardly at approximately a 45 degree angle relative to the base by a coil spring 161 disposed about the portion of the shaft which extends outwardly from the frame 140 with one end of the spring attached to the lever and the other end attached to the longitudinal member 143.

A nut or ear 164, welded to one side of the lever 160 and provided with a threaded aperture, receives a bolt 165 which is attached thereto and is disposed substantially right angularly to the longitudinal axis of the operating lever with its axis disposed in a vertical plane parallel to the plane of movement of the lever. A lock nut 166 on the bolt 165 is adapted to engage the ear 164 and lock the bolt 165 in any adjusted position relative to the flange. As the operating lever is pivoted downwardly against the biasing action of the spring 161, the head 165a of the bolt engages a stop block 167 welded to the flange 106 of the base 105, thus limiting the pivotal movement of the operating lever. The bolt 165, adjustable lengthwise through the threaded aperture of the ear 164, provides a means for varying the downward limit of pivotal movement of the operating lever.

When the pivotal arm 120 is in its lowermost position with the shank of the latch pin 33 disposed within the groove 150 of the box frame end member 141, downward movement of the operating lever rotates the shaft 155 and causes the sharp edge of the tool 156 to engage the shank of the pin 33. When a downward force of predetermined value is exerted on the operating lever, the tool 156 is caused to gauge the shank of the pin and form a spur 36 thereon.

The bottom portion of the groove 150 of the box frame end member 141 is enlarged to receive the threaded shank of a positioning bolt 170 which is threaded through apertures in the base 105 and the bottom member 144 of the box frame member. The end of the bolt 170 disposed within the groove limits the downward movement of the latch pin 33. The vertical position of the bolt 170 within the groove determines the point on the shank of the latch pin 33 at which a spur will be formed. A lock nut 171 is provided on the positioning bolt to lock the bolt in any vertically adjusted position. Such means for adjusting the location of the spur on the latch pin is desirable so that the latch pin may be adapted to cooperate with various types of window frame latch recesses by controlling the length of latch pin shank which protrudes from the screen frame member when installed therein.

The magazine unloading mechanism 174 of the tool 100, which is operable to unload the springs from the magazine M one at a time, is adapted to place a spring 35 in alignment with the slots 137 and 138 of the pivotal arm in proper position to receive a latch pin. The magazine unloading mechanism is disposed on the right side of the base 105, as viewed in FIGURE 19, and includes a rectangular spring feeder plate 175 having a plurality of arcuate spring receiving recesses 176 in its forward edge portion. The recesses form prongs 177 so that the recesses partially receive the coil springs in the magazine M and the prongs are disposed between adjacent springs, as shown in FIGURE 22, when the forward edge portion of the feeder plate is inserted through the open side of the magazine M. The feeder plate is mounted for rectilinear sliding movement in a horizontal plane so that the prongs may be readily inserted between and withdrawn from between the coil springs in the magazine. The feeder plate 175, provided with an upright handle H whereby it may be manipulated in its sliding movements, is mounted immovably upon a rectangular longitudinal slide plate 175a by means of screws 178 and pegs 179. The longitudinal slide plate is slidably mounted on a transverse slide plate 180 for movement in a longitudinal direction relative to the base 105. The transverse slide plate is in turn slidably mounted on a base plate 181, fixed to the base 105, for transverse movement relative to the base. The longitudinal slide plate is guided in its movement relative to the transverse slide plate by a longitudinal tongue 185 disposed parallel to the plane of movement of the pivotal arm and secured to the transverse slide plate by friction fitting pegs 186. Adjacent surfaces of the longitudinal and transverse slide plates are provided with aligned grooves in which the tongue is received. The tongue may be rigidly secured in any suitable manner to one of the slide plates and be slidable in the groove of the other plate.

The transverse slide plate 180 is guided in its movement relative to the base plate 181 by transverse tongues 190, 191, and 192 disposed perpendicularly to the plane of movement of the pivotal arm 120 in aligned grooves of the adjacent surfaces of the transverse slide plate and the base plate. The transverse tongues are rigidly secured to the base plate 181 by screws 193, 194, and 195, respectively. The transverse slide plate, of course, is slidable relative to the transverse tongues which are slidably received in the downwardly facing grooves thereof. The base plate 181 is secured to the base 105 by screws or bolts 196 and 197.

It will therefore be seen that the spring feeder plate 175 is movable in a horizontal plane in both longitudinal and transverse directions relative to the base 105.

An L-shaped base extension 200, affixed to the flange 107 of the base 105 by welding, or otherwise, with the upper surface of one leg 201 thereof disposed co-planar with the upper surface of the base 105, provides an enlargement of the base 105 and additional support for the magazine unloading mechanism. A right-angle retaining clamp 205 is secured to the base plate 181 by a bolt 206. One leg 207 of the clamp is disposed against the top surface of the feeder plate 175, thus retaining the plates 175, 178, and 180 between the base plate 181 and the clamp leg 207.

Transverse movement of the feeder plate in a direction away from the pivotal arm 120 is limited by engagement of the transverse slide plate 180 with the vertical leg 208 of the retaining clamp 205. Transverse movement in a direction toward the pivotal arm is, of course, limited by engagement of the feeder plate with the coil springs in the magazine when the pivotal arm is disposed horizontally adjacent the unloading mechanism. Longitudinal movement of the feeder plate in one direction is limited by engagement of the leg 207 of the retaining clamp 205 with the head of the bolt 178a and in the other longitudinal direction by the engagement of the edge 209 with the edge of the side plate or member 140 of the pivotal arm. The amount of longitudinal movement of the feeder plate within these limits corresponds substantially to the distance between an adjacent pair of prongs 77 so that the feeder mechanism can move only one of the springs at a time out of the magazine and into alignment with the slots in the end of the pivotal arm.

Alternatively, longitudinal movement of the longitudinal slide plate relative to the transverse slide plate may be limited by a pair of stops 185b and 185c which are attached to the longitudinal slide plate by pegs 186b and 186c, respectively. The stops, at opposite ends of the guide 185a, are slidable within extensions of the groove in the transverse slide plate which receives the guide 185a. The stops are adapted to limit movement of the longitudinal slide plate in either direction by engagement with the ends of the guide.

It will thus be seen that whenever it is desired to unload a coil spring 35 from the magazine and place it in alignment with the slots 137 and 138 of the pivotal arm, the feeder plate is moved into engagement with the coil springs of the magazine and then moved longitudinally to the right, as viewed in FIGURE 22, to force one of the springs 35 out the end of the magazine. The feeder plate may then be retracted transversely from engagement with the magazine and the pivotal arm pivoted upwardly to facilitate the telescoping of a screen frame member 31 thereon, the slide stop 125 being positioned on the arm 120 to align the apertures 45 in the screen frame member with the slots in the end of the pivotal arm. A latch pin 33 may then be inserted through the slots 137 and 138 and the spring as in the manner performed in the operation of the tool 60 of FIGURE 3. The operation of the tool 101 for forming the spur on the latch pin is substantially identical with that performed with the tool 60.

It will thus be seen that a new and improved latch device for securing a screen frame within the opening of a window frame is disclosed herein which is adapted to be carried by the screen frame and spring-biased to extend outwardly thereof for engagement with cooperating latch means of the window frame.

It will also be seen that an installation tool for installing latch devices in a screen frame member is disclosed herein which comprises a pivotal arm adapted to support a screen frame member and carry a coil spring whereby a latch pin may be inserted through aligned apertures of the frame member and the coil of the spring, and means for forming a spur on the shank of the latch pin whereby the latch pin may be installed on the frame member with the spring in engagement with the spur to bias the latch pin in a given position relative to the frame member.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A tool for installing a latch device in a hollow frame member having a transverse opening extending therethrough comprising: a base member; an elongate arm pivotally mounted on said base member and adapted to be telescoped in said frame member; means on said arm for carrying a coil spring; means on said arm for holding said frame member when telescoped on said arm with the transverse opening thereof aligned with the axis of said spring whereby a latch pin may be inserted to extend through the transverse opening of said frame member and the coils of said spring; and means for forming a spur on the shank of said latch pin when said latch pin extends through said transverse opening whereby said latch pin may be positioned on said frame member with one end of said spring in abutting relation with said spur and the other end of said spring in abutting relation with said frame member.

2. A tool for installing a latch device in a hollow frame member having a transverse opening for receiving the shank of a latch pin therethrough comprising: a base member, an elongate arm pivotally mounted on said base member, said screen frame member being adapted to be sleeved over said arm and to be supported thereby; means on said arm for carrying a spring having an opening therethrough; means on said arm for holding said frame member when telescoped on said arm with the transverse opening thereof aligned with the opening of said spring whereby a latch pin may be inserted to extend through the transverse opening of said frame member and the opening of said spring; and means for forming a spur on the shank of said latch pin when said latch pin extends through said transverse opening whereby said latch pin may be positioned on said frame member with one end of the opening of said spring in abutting relation with said spur and the other end of the opening of said spring in abutting relation with said frame member.

3. A tool for installing a latch device in a hollow screen frame member having a transverse opening for receiving the shank of a latch pin therethrough and comprising: a base member; an elongate arm pivotally mounted on said base member and adapted to be telescopically received in said frame member; means on said arm for supporting a coil spring; a slide stop adjustable longitudinally of said arm for holding said frame member when telescoped on said arm with the transverse opening thereof aligned with the axis of said spring whereby a latch pin may be inserted to extend through the transverse opening of said frame member and the coils of said spring; and means for forming a shoulder on the shank of said latch pin when the latch pin extends through said transverse opening whereby said latch pin may be positioned on said frame member with one end of said spring in abutting relation with said shoulder and the other end of said spring in abutting relation with said frame member to bias said latch pin in a position where a portion of the pin extends outwardly of the frame member.

4. A tool for installing a latch device in a hollow screen frame member having a transverse opening for receiving the shank of a latch pin therethrough and comprising: a base member; an elongate arm pivotally mounted on said base member and adapted to be telescopically received in said frame member, said arm having a socket formed in one end thereof for supportably receiving a coil spring therein; a slide stop adjustable longitudinally of said arm for holding said frame member when telescoped on said arm with the transverse opening thereof aligned with the axis of said spring whereby a latch pin may be inserted to extend through the transverse opening of said frame member and the coils of said spring; and means for forming a shoulder on the shank of said latch pin when the latch pin extends through said transverse opening whereby said latch pin may be positioned on said frame member with one end of said spring in abutting relation with said shoulder and the other end of said spring in abutting relation with said frame member.

5. A tool for installing a latch device in an elongate hollow frame member having a transverse opening for receiving the shank of a latch pin therethrough and comprising: a base member; an arm pivotally mounted on said base member and adapted to be telescopically received in said frame member; means on said arm for carrying a coil spring; means on said arm for holding said frame member when telescoped on said arm with the transverse opening thereof aligned with the coil axis of said spring whereby a latch pin may be inserted to extend through the transverse opening of said frame member and the coils of said spring; a sharp edged tool pivotally mounted on said base member whereby for a predetermined pivotal position of said arm the sharp edge of said tool is adapted to engage with the shank of said latch pin when disposed through said transverse opening; and lever means for pivoting said sharp edged tool into engagement with the shank of said latch pin whereby pressure exerted on said lever means will cause said sharp edged tool to bite into the shank of said latch pin and form a spur thereon.

6. A tool for installing a latch device in an elongate hollow frame member having a transverse opening for receiving the shank of a latch pin therethrough and comprising: a base member; a channel shaped arm pivotally mounted on said base member, said arm being telescopically receivable within said frame member, said arm being adapted to telescopically receive within the channel thereof an elongate magazine housing having a plurality of coil springs disposed longitudinally therein; means defining a socket in the end of said arm for supporting a coil spring therein; means supported by said base member and operable to move one of the springs of said magazine into the socket of said arm when said magazine is received in said arm; means on said arm for holding said frame member when telescoped on said arm with the transverse opening thereof aligned with the coil axis of said spring whereby a latch pin may be inserted to extend through the transverse opening of said frame member and the coils of said spring; and means for forming a shoulder on the shank of said latch pin when the latch pin extends through said transverse opening and said pivotal arm is in a predetermined position.

7. A tool for installing a latch device in an elongate hollow frame member having a transverse opening extending therethrough for receiving the shank of a latch pin and comprising: a base member; a channel shaped arm pivotally mounted on said base member and adapted to receive said frame member in sleeved relation about said arm; a channel shaped member disposed within the channel of said arm in friction fitting relation therewith, said channel shaped member being adapted to carry a plurality of coil springs within the channel of said channel shaped member; means defining a socket on the end of said arm for supporting a coil spring therein; means on said base member operable to move the springs of said channel shaped member one at a time into the socket of said arm; means on said arm for holding said frame member when sleeved about said arm with the transverse opening thereof in substantial alignment with the coil axis of a spring supported in said socket whereby a latch pin may be inserted to extend through the transverse opening of said frame member and the coils of said spring in said socket; and means for forming a shoulder on the shank of said latch pin when the latch pin extends through said transverse opening and said arm is in a predetermined position relative to said base member.

8. A tool for installing a latch device in an elongate hollow frame member having a transverse opening for receiving the shank of a latch pin and comprising: a base member; an elongate channel shaped arm pivotally mounted on said base member and adapted to receive said frame member in sleeved relation about said arm; a channel shaped member disposed within the channel of said arm in friction fitting relation therewith, said channel shaped member being adapted to carry a plurality of coil springs within the channel of said channel shaped member; means defining a socket in the end of said arm for supporting a coil spring therein; a feeder plate slidably mounted on said base member for movement longitudinally and transversely relative to said arm, said feeder plate being engageable with the coil springs in said channel shaped member along one edge of said plate when said arm is in a predetermined position, said one edge having a plurality of recesses for receiving the coil springs of the channel shaped member therein when said plate is moved into engagement with said springs whereby longitudinal movement of said feeder plate causes one of the springs of said channel shaped member to be moved into said socket; means on said arm for positioning said frame member when sleeved about said arm with the transverse opening thereof in substantial alignment with the coil axis of a spring supported in said socket whereby a latch pin may be inserted to extend through the transverse opening of said frame member and the coils of said spring in said socket; and means for forming a shoulder on the shank of said latch pin when the latch pin extends through said transverse opening and said arm is in said predetermined position.

9. A tool for installing a latch device in an elongate hollow screen frame member having a transverse opening extending therethrough and comprising: a base member; an elongate arm pivotally mounted on said base member and having a lateral recess formed therein, said arm being adapted to receive said frame member in sleeved relation about said arm, said arm being adapted to receive said frame member in sleeved relation about said arm, said arm being adapted to receive a coil spring magazine within said lateral recess; means defining a socket in the end of said arm for supporting a coil spring therein; means on said base member operable to move the springs of said magazine one at a time into said socket; means on said arm engageable with said frame member for positioning said frame member on said pivotal arm with the transverse opening of said frame member in substantial alignment with the coil axis of a spring supported in said socket whereby a latch pin may be inserted to extend through said transverse opening and the coils of a spring supported in said socket; and means operable for a predetermined position of said arm to form a spur on the shank of said latch pin when said latch pin is disposed through said transverse opening and a spring supported in said socket.

References Cited in the file of this patent

UNITED STATES PATENTS

| | | |
|---|---|---|
| 1,720,593 | Geiser | July 9, 1929 |
| 2,477,524 | Oswald et al. | July 26, 1949 |
| 2,484,043 | Malen | Oct. 11, 1949 |
| 2,889,618 | Morris et al. | June 9, 1959 |